United States Patent

(12) United States Patent
Su

(10) Patent No.: US 9,112,915 B2
(45) Date of Patent: Aug. 18, 2015

(54) METHOD AND APPARATUS FOR PROTOCOL PARSING

(75) Inventor: Dexian Su, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 123 days.

(21) Appl. No.: 13/495,345

(22) Filed: Jun. 13, 2012

(65) Prior Publication Data

US 2012/0314584 A1    Dec. 13, 2012

Related U.S. Application Data

(63) Continuation of application No. PCT/CN2011/075689, filed on Jun. 13, 2011.

(51) Int. Cl.
| | |
|---|---|
| H04L 29/06 | (2006.01) |
| H04L 12/26 | (2006.01) |
| H04L 12/851 | (2013.01) |

(52) U.S. Cl.
CPC .............. H04L 69/22 (2013.01); H04L 43/18 (2013.01); H04L 47/2483 (2013.01)

(58) Field of Classification Search
None
See application file for complete search history.

(56) References Cited

U.S. PATENT DOCUMENTS

| | | | |
|---|---|---|---|
| 7,272,646 B2 * | 9/2007 | Cooper et al. ............... | 709/223 |
| 7,619,983 B2 | 11/2009 | Panigrahy | |
| 7,802,303 B1 | 9/2010 | Zhao et al. | |
| 2002/0156886 A1 * | 10/2002 | Krieski et al. ............... | 709/224 |
| 2002/0186697 A1 * | 12/2002 | Thakkar ....................... | 370/401 |
| 2003/0204584 A1 | 10/2003 | Zeira et al. | |
| 2004/0083299 A1 | 4/2004 | Dietz et al. | |
| 2004/0088425 A1 | 5/2004 | Rubinstein et al. | |
| 2006/0280178 A1 * | 12/2006 | Miller et al. ................. | 370/389 |
| 2008/0019368 A1 * | 1/2008 | Liu et al. ...................... | 370/392 |
| 2008/0040496 A1 * | 2/2008 | Zhao et al. .................... | 709/230 |
| 2008/0276316 A1 * | 11/2008 | Roelker et al. ................ | 726/23 |
| 2009/0327993 A1 | 12/2009 | Chinta et al. | |
| 2010/0085883 A1 * | 4/2010 | Paster ........................... | 370/252 |

(Continued)

FOREIGN PATENT DOCUMENTS

| | | |
|---|---|---|
| CN | 1450757 | 10/2003 |
| CN | 1842081 | 10/2006 |

(Continued)

OTHER PUBLICATIONS

Li Dong et al., "Protocol Parsing Method Based on Compiling Technology", Computer Engineering, vol. 33, No. 21, Nov. 2007, pp. 66-68.

(Continued)

*Primary Examiner* — Chirag Shah
*Assistant Examiner* — Suk Jin Kang
(74) *Attorney, Agent, or Firm* — Staas & Halsey LLP

(57) ABSTRACT

A method and apparatus for protocol parsing are disclosed, the method includes: performing flow table matching on a received packet to recognize a protocol of the packet; and when a protocol type of the packet is recognized and it is determined that the protocol type of the packet is a text-based protocol type, performing keyword matching on the packet according to a keyword matching rule in a keyword library corresponding to the protocol type of the packet, and extracting content of a keyword to be parsed in the packet; wherein, the keyword matching rule in the keyword library includes a keyword and the content of the keyword to be parsed expressed using a regular expression.

17 Claims, 4 Drawing Sheets

(56) References Cited

U.S. PATENT DOCUMENTS

2011/0030057 A1* 2/2011 Chen et al. .................. 726/23
2012/0099597 A1   4/2012 Dong et al.

FOREIGN PATENT DOCUMENTS

| CN | 101035131 | 9/2007 |
| CN | 101060396 | 10/2007 |
| CN | 101262491 | 9/2008 |
| CN | 101286936 | 10/2008 |
| CN | 102075404 | 5/2011 |
| CN | 102082762 | 6/2011 |

OTHER PUBLICATIONS

International Search Report dated Mar. 22, 2012 issued in corresponding International Patent Application No. PCT/CN2011/075689.
First Office Action, dated Jan. 18, 2013, in corresponding Chinese Application No. 201180000837.0 (11 pp.).
European Office Action issued Nov. 11, 2013 in corresponding European Application No. 11 83 8992.

* cited by examiner

METHOD AND APPARATUS FOR PROTOCOL PARSING

CROSS-REFERENCE TO RELATED APPLICATIONS

This application is a continuation of International Application No. PCT/CN2011/075689, filed on Jun. 13, 2011, all of which are hereby incorporated by reference in their entireties.

FIELD OF THE INVENTION

The present invention relates to a communications technology field, and in particular, to a method and an apparatus for protocol parsing.

BACKGROUND OF THE INVENTION

DPI (Deep Packet Inspection, deep packet inspection) technology is an application layer—based flow detection and control technology. As the applications of content charging and various value-added services develop, in the application of the DPI technology, in addition to protocol recognition on the flow content (for example, the flow content is recognized as an HTTP protocol or other protocols), protocol parsing of the flow content is required.

During DPI processing by using the prior art, the quintuple information in the data flow packet, including the protocol field (Type), source port, destination port, source IP address, and destination IP address, is extracted from the data flow packet. Then, flow table matching is performed (the flow table stores the correspondence between the recognized protocol and the quintuple). The protocol type is recognized by performing flow table matching.

If the protocol type of a packet cannot be recognized by performing flow table matching, protocol recognition is performed on the packet, including signature recognition, associated recognition, and heuristic recognition, to recognize the packet type and update the flow table. In addition, for the packet of which the protocol type is recognized during flow table matching, it is determined whether to parse the protocol. If yes, the protocol parsing of the packet is performed, and the content of certain keywords (also called fields and key fields) in the packet is parsed by performing protocol parsing.

During protocol parsing by using the prior art, the method of scanning bytes one by one is used. Supposing that the HTTP header has the following content:

GET/cn HTTP1.1\n\rAccept:image/gif, image/x-xbitmap, image/jpeg\n\r

The parsing is performed according to the HTTP format, starting from the letter G For example, when GET is obtained after the parsing, if a space is obtained after the parsing, it may be learned that the protocol version number (HTTP1.1) appears in the next position after several characters (/cn) and another space.

During the implementation of the present invention, the inventor discovers the following disadvantages in the prior art:

When protocol parsing is performed by scanning bytes one by one, if new rules need to be parsed, the distribution rules for various fields in the new protocol packet need to be known. This process requires a large amount of time. The process is complicated, and does not facilitate extension of new rules.

SUMMARY OF THE INVENTION

Embodiments of the present invention provide a method and an apparatus for protocol parsing, implementing one-to-one mapping between a keyword library and a protocol type by establishing a keyword library, and enhancing the extensibility of protocols and protocol fields by using various matching rules.

The technical solution used in the embodiments includes:

a method for protocol parsing, including:

performing flow table matching on a received packet to recognize a protocol of the packet; and when a protocol type of the packet is recognized, and it is determined that the protocol type of the packet is a text-based protocol type, performing keyword matching on the packet according to a keyword matching rule in a keyword library corresponding to the protocol type of the packet, and extracting content of a keyword to be parsed in the packet; where, the keyword matching rule in the keyword library includes a keyword and the content of the keyword to be parsed expressed using a regular expression; and an apparatus for protocol parsing, including:

a flow table matching module, configured to perform flow table matching on a received packet to recognize a protocol of the packet; and a keyword matching module, configured to: when a protocol type of the packet is recognized, and it is determined that the protocol type of the packet is a text-based protocol type, perform keyword matching on the packet according to a keyword matching rule in a keyword library corresponding to the protocol type of the packet, and extract content of a keyword to be parsed in the packet; where, the keyword matching rule in the keyword library includes a keyword and the content of the keyword to be parsed expressed using a regular expression.

The method and apparatus for protocol parsing provided in embodiments of the present invention perform flow table matching on a received packet to recognize a protocol of the packet, and when a protocol type of the packet is recognized, and it is determined that the protocol type of the packet is a text-based protocol type, perform keyword matching on the packet according to a keyword matching rule in a keyword library corresponding to the protocol type of the packet, and extract content of a keyword to be parsed in the packet. Compared with the prior art, the method for protocol parsing provided in this embodiment implements keyword matching on a packet through a keyword matching rule in the keyword library corresponding to a protocol type of the packet, where, the keyword matching rule in the keyword library includes a keyword and the content of the keyword to be parsed expressed using a regular expression. In this manner, when a new protocol or a new field needs to be parsed, only a new keyword library needs to be added, and a new matching rule is written by using regular expressions. The implementation of writing a matching rule by using regular expressions is simple. Therefore, the extensibility of protocols and protocol fields (keywords) is enhanced.

DETAILED DESCRIPTION OF THE EMBODIMENTS

To make the advantages of the present invention clear, the following further describes the present invention with the accompany drawings and embodiments.

Figure 1:
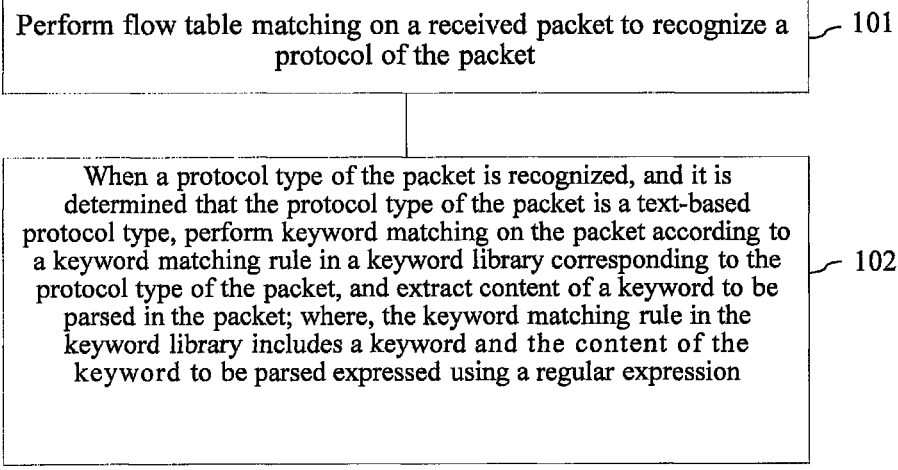
FIG. 1 is a flowchart of a method according to an embodiment of the present invention.

An embodiment provides a method for protocol parsing, as shown in FIG. 1, including:

Step 101: Perform flow table matching on a received packet to recognize a protocol of the packet.

The recognition is mainly performed through a flow table. After packet quintuple (including a source port, destination port, source IP address, destination IP address, and type) information is received, a user ID, an IP address, a source port number, a VPN (Virtual Private Network, virtual private network), and a protocol type are recognized by performing flow table matching. Specifically, the flow table stores the correspondence between quintuple information and other information. Therefore, the information items (including the protocol type) corresponding to the quintuple may be found by matching the quintuple, thereby determining the protocol type of the packet. The specific implementation technology for the flow table is a technology known to those skilled in the art, and is not described here.

Step 102: When a protocol type of the packet is recognized, and it is determined that the protocol type of the packet is a text-based protocol type, perform keyword matching on the packet according to a keyword matching rule in a keyword library corresponding to the protocol type of the packet, and extract content of a keyword to be parsed in the packet; where, the keyword matching rule in the keyword library includes a keyword and the content of the keyword to be parsed expressed using a regular expression.

After step 101, the method further includes:

when the protocol type of the packet is recognized and it is determined that the protocol type of the packet is not a text-based protocol type, performing protocol recognition on the packet, and sending a result of the protocol recognition to an application software program to process; and when the protocol type of the packet is not recognized through a flow table, recognizing the protocol type of the packet by performing signature recognition to recognize whether the protocol type of the packet is a text-based protocol type; if yes, performing keyword matching on the packet; if not, performing protocol recognition on the packet to recognize the protocol type of the packet.

Specifically, performing keyword matching on the packet according to a keyword matching rule in a keyword library corresponding to the protocol type of the packet, and extracting content of a keyword to be parsed in the packet include:

reading a protocol number corresponding to the protocol type of the packet;

reading a keyword library corresponding to the protocol number; and performing keyword matching on the packet according to the keyword library to obtain a matching rule ID (which is a numerical number) corresponding to a matched keyword, and a start offset position and an end offset position of the matched keyword.

Further, when the keyword library corresponding to the protocol number does not exist, the keyword library is updated and a keyword library that corresponds to the protocol type corresponding to the protocol number is established.

Specifically, establishing the keyword library that corresponds to the protocol type corresponding to the protocol number includes:

using a key field and a key field value of the protocol as matching features to establish the keyword library;

specifically, the key field is expressed by using character strings, and the key field value is expressed by using the asterisk (*);

where, the keyword library is established based on each protocol, and each protocol corresponds to one independent keyword library.

Further, the following is included: when the packet is in a cross-package state, storing the packet;

cross-package means that an entire packet cannot be stored in a same package due to restrictions on packet length and package capacity, and therefore the packet needs to be divided and placed in two different packages to store.

Specifically, the text-based protocol means a protocol the header of which is expressed in text and the length of each field is variable (that is, the length does not have fixed bits). For example, text-based protocols include HTTP, FTP, RTSP, MMS, SIP, and TFTP.

Further, after step 102, the method also includes:

processing a result of the keyword matching, and encapsulating the matching rule ID corresponding to the matched keyword and the start offset position and end offset position of the matched keyword into a specific data structure, so that the application software program performs data processing according to the specific data structure;

where, the rule is used to extract content corresponding to the rule in the keyword;

where, the specific data structure indicates an agreed data result that can be recognized by the application software program, and the specific implementation form is not fixed.

The method for protocol parsing provided in this embodiment implements keyword matching on a packet through a keyword matching rule in the keyword library corresponding to a protocol type of the packet, where, the keyword matching rule in the keyword library includes a keyword and the content of the keyword to be parsed expressed using a regular expression. In this manner, when a new protocol or a new field needs to be parsed, only a new keyword library needs to be added, and a new matching rule is written by using regular expressions. The implementation of writing a matching rule by using regular expressions is simple. Therefore, the extensibility of protocols and protocol fields is enhanced.

Figure 2:
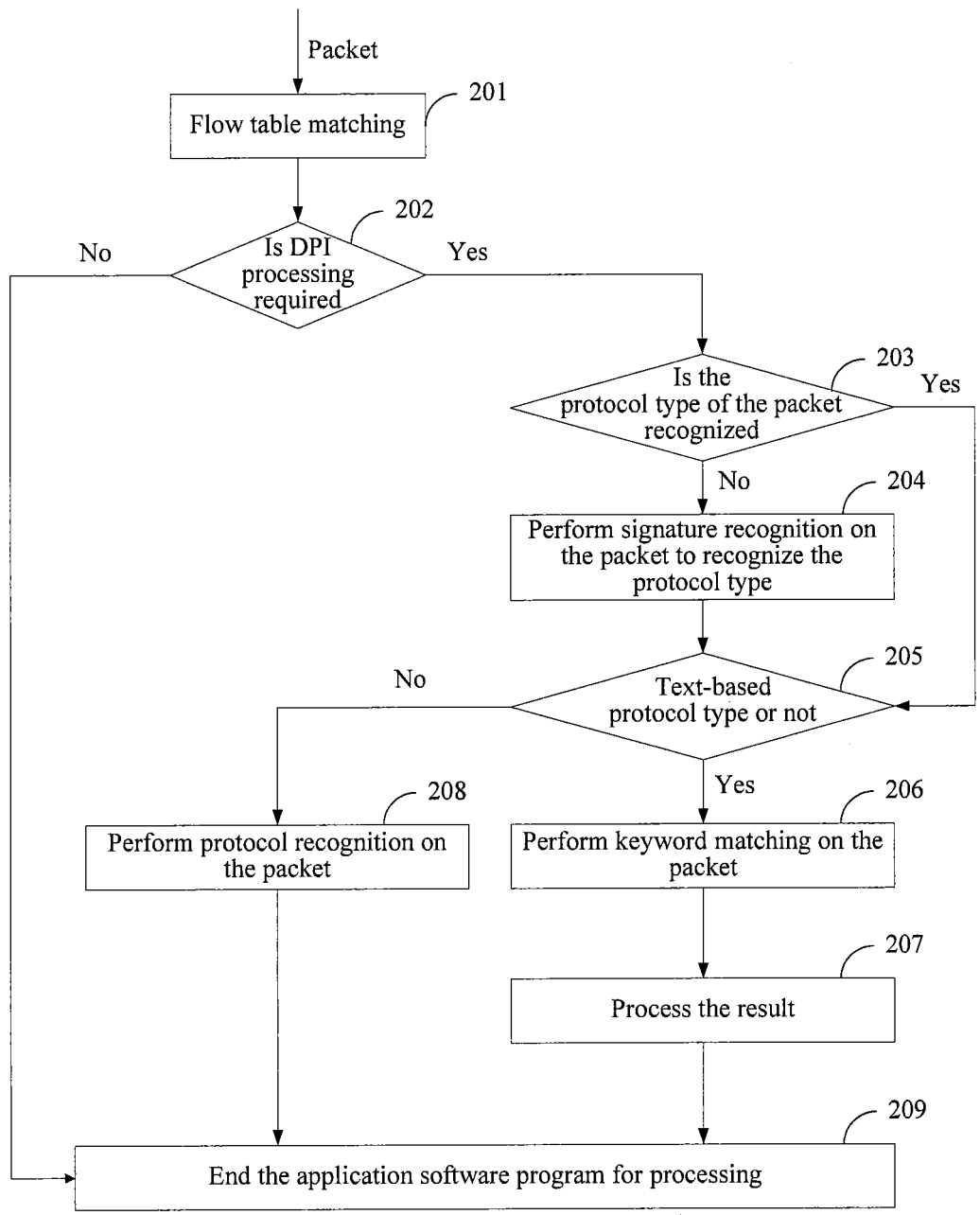
FIG. 2 is a flowchart of a method according to another embodiment of the present invention.

Another embodiment provides a method for protocol parsing, as shown in FIG. 2, including:

Step 201: Perform stream table matching on a packet.

The recognition is mainly performed through a flow table. After packet quintuple (including a source port, destination port, source IP address, destination IP address, and type) information is received, a user ID, an IP address, a source port number, a VPN (Virtual Private Network, virtual private network), and a protocol type are recognized by performing flow table matching. Specifically, the flow table stores the correspondence between quintuple information and other information. Therefore, the information items (including the protocol type) corresponding to the quintuple can be found by matching the quintuple, thereby determining the protocol type of the packet. The specific implementation technology for the flow table is a technology known to those skilled in the art, and is not described here.

Step 202: Determine whether the packet requires DPI processing. If DPI processing is required, go to step 203; if DPI processing is not required, go to step 209.

Step 203: Determine whether the protocol type of the packet is recognized. If the protocol type of the packet is not recognized, go to step 204; if the protocol type of the packet is recognized, go to step 205.

Step 204: Perform signature recognition on the packet of which the protocol type is not recognized to recognize the protocol type.

Specifically, the information recognized by signature recognition mainly includes a character, a regular expression, a port number, and an IP address.

Step 205: Determine whether the protocol type of the packet is a text-based protocol type. If the protocol type of the packet is a text-based protocol type, go to step 206; if the protocol type of the packet is not a text-based protocol type, go to step 208.

Specifically, the text-based protocol means a protocol the header of which is expressed in text and the length of each field is variable (that is, the length does not have fixed bits). For example, text-based protocols include HTTP, FTP, RTSP, MMS, SIP, and TFTP.

Step 206: Perform keyword matching on the packet.

Specifically, the keyword matching is performed to match the packet through a rule ID, thereby determining the content of the field corresponding to the rule ID.

The following takes the HTTP protocol as an example and lists regular expressions for various fields:
GET\x20.*\x20HTTP1.1\x0d\x0a\w
POST\x20.*\x20HTTP1.1\x0d\x0a\w
Accept-Language:\x20.*\x0d\x0a\w
Connection:\x20.*\x0d\x0a\w
User-Agent:\x20.*\x0d\x0a\w
Host:\x20.*\x0d\x0a\w
Content-Length:\x20.*\x0d\x0a\w For example, for the Connection keyword (a keyword is also called field or key field in embodiments of the present invention; these three terms are not strictly distinguished between each other), a typical presentation form of the keyword in the packet header is as follows:
Connection: Keep-Alive\r\n
That is, the switch of the keyword Connection follows a colon, a space, and then the Keep-Alive content. The form ends with a carriage-return character for starting another line.

For the content of the preceding keyword, the regular expression "Connection:\x20.*\x0d\x0a\w" can be used to describe the rule. It can be seen that the regular expression includes two parts: keyword (Connection) and keyword content (".*" is used to indicate the matching content; \x20 and \x0d\x0a\w are used to confine the position of the keyword content in the entire rule, where \x0d indicates an carriage-return character, \x0a indicates another line, and \w indicates any one letter character). In this manner, by using the rule expressed by the preceding regular expression to perform keyword matching, content of the matched rule can be extracted, for example, Connection: Keep-Alive\r\n, and the content (such as Keep-Alive) in the Connection may be easily obtained. The meaning of each symbol in each of the preceding regular expressions is a technology known to those skilled in the art (for example, \x20 indicates a character whose hexadecimal ASCII code is 20, that is, a space), and is not described here.

Specifically, performing keyword matching on the packet to extract the content of the fields to be parsed in the packet includes:

reading a protocol number corresponding to the protocol type of the packet;
reading a keyword library corresponding to the protocol number; and
performing keyword matching on the packet according to the keyword library to obtain a matching rule ID corresponding to a matched keyword, and a start offset position and an end offset position of the matched keyword.

The start offset position or end offset position may also be the start offset position and end offset position of the keyword content, respectively, and is not confined here.

Figure 3:
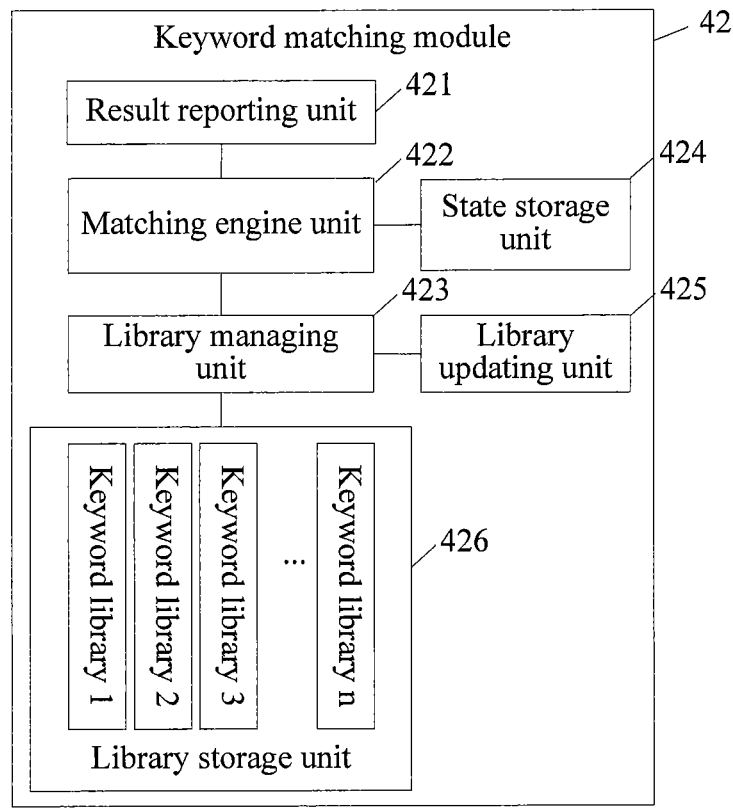
FIG. 3 shows a structure of a keyword matching module according to an embodiment of the present invention.

Further, the step 206 can be executed by a keyword matching module 42, where, as shown in FIG. 3, the keyword matching module 42 includes:
a result reporting unit 421, configured to encapsulate and report a keyword matching result after the keyword matching is complete;
a matching engine unit 422, configured to read a protocol number corresponding to the protocol type of the packet and perform keyword matching on the packet according to the keyword library to obtain a matching rule ID corresponding to a matched keyword and a start offset position and an end offset position of the matched keyword;
a library managing unit 423, configured to read a keyword library corresponding to the protocol number;
a state storage unit 424, configured to store the packet when the packet is in a cross-package state;
a library updating unit 425, configured to update the keyword library and establish a keyword library that corresponds to the protocol type corresponding to the protocol number when the keyword library corresponding to the protocol number does not exist; and
a library storage unit 426, configured to store a keyword library corresponding to each protocol, where each protocol corresponds to one keyword library.

Specifically, establishing the keyword library that corresponds to the protocol type corresponding to the protocol number includes:
using a key field and a key field value of the protocol as matching features to establish the keyword library;
specifically, the key field is expressed by using character strings, and the key field value is expressed by using the asterisk (*);
where, the keyword library is established based on each protocol, and each protocol corresponds to one independent keyword library.

Further, the following is included: when the packet is in a cross-package state, storing the packet;
cross-package means that a segment of a complete packet cannot be stored in a same package due to restrictions on packet length and package capacity, and therefore the packet needs to be divided and placed in two different packages to store.

Step 207: Process a result.
Specifically, processing the result includes:
encapsulating a matching rule ID corresponding to the matched keyword and the start offset position and end offset position of the matched keyword into a specific data structure, so that the application software program performs data processing according to the specific data structure.

Step 208: Perform protocol recognition on the packet.
Specifically, the protocol recognition includes signature recognition, associated recognition, and heuristic recognition.

Step 209: Send the packet to the application software program to process.

The method for protocol parsing provided in this embodiment implements keyword matching on a packet through a keyword matching rule in the keyword library corresponding to a protocol type of the packet, where, the keyword matching rule in the keyword library includes a keyword and the content of the keyword to be parsed expressed using a regular expression. In this manner, when a new protocol or a new field needs to be parsed, only a new keyword library needs to be added, and a new matching rule is written by using regular expressions. The implementation of writing a matching rule by using regular expressions is simple. Therefore, the extensibility of protocols and protocol fields is enhanced.

Figure 4:
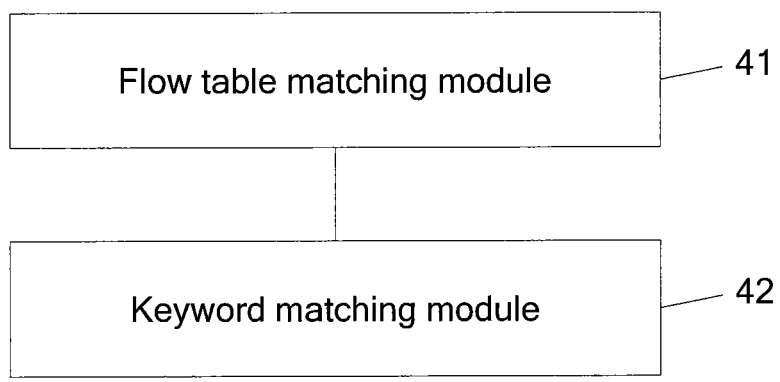
FIG. 4 shows a structure of an apparatus according to another embodiment of the present invention.

Another embodiment provides an apparatus for protocol parsing, as shown in FIG. 4, including:

a flow table matching module 41, configured to perform flow table matching on a received packet to recognize a protocol of the packet; and a keyword matching module 42, configured to: when a protocol type of the packet is recognized and it is determined that the protocol type of the packet is a text-based protocol type, perform keyword matching on the packet according to a keyword matching rule in a keyword library corresponding to the protocol type of the packet, and extract content of a keyword to be parsed in the packet; where, the keyword matching rule in the keyword library includes a keyword and the content of the keyword to be parsed expressed using a regular expression.

Figure 5:
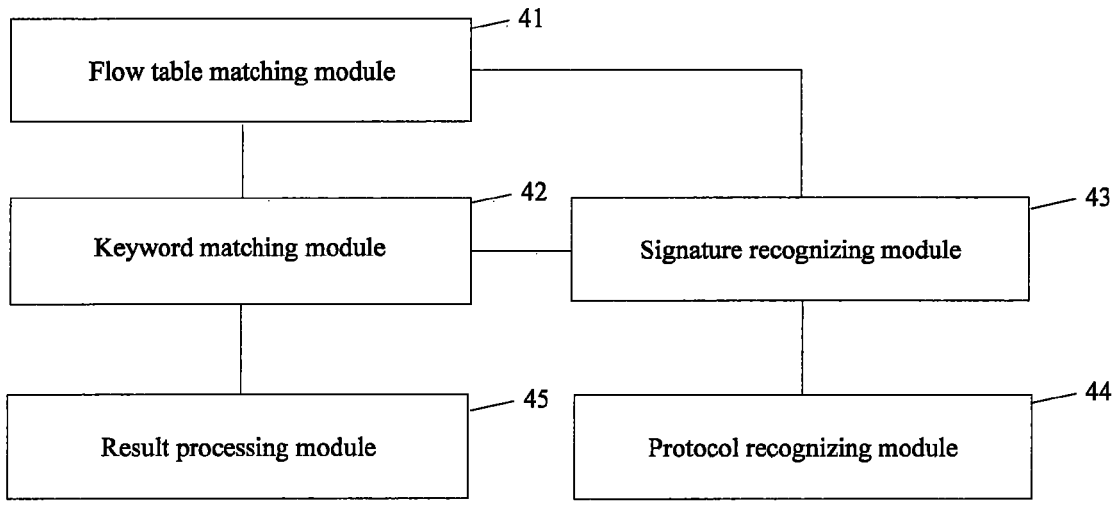
FIG. 5 shows a structure of an apparatus according to another embodiment of the present invention.

Further, as shown in FIG. 5, the apparatus for protocol parsing further includes:

a signature recognizing module 43, configured to: when the protocol type of the packet is not recognized through the flow table, recognize the protocol type of the packet by performing signature recognition to recognize whether the protocol type of the packet is a text-based protocol type; if yes, perform keyword matching on the packet; if not, perform protocol recognition on the packet to recognize the protocol type of the packet;

a protocol recognizing module 44, configured to: when the protocol type of the packet is recognized and it is determined that the protocol type of the packet is not a text-based protocol type, perform protocol recognition on the packet, and send a result of the protocol recognition after the protocol recognition to an application software program to process; and a result processing module 45, configured to process a result of the keyword matching, and encapsulate a matching rule ID corresponding to the matched keyword and the start offset position and end offset position of the matched keyword into a specific data structure, so that the application software program performs data processing according to the specific data structure.

The keyword matching module 42 includes:

a result reporting unit 421, configured to encapsulate and report a keyword matching result after the keyword matching is complete;

a matching engine unit 422, configured to read a protocol number corresponding to the protocol type of the packet and perform keyword matching on the packet according to the keyword library to obtain a matching rule ID corresponding to a matched keyword and a start offset position and an end offset position of the matched keyword;

a library managing unit 423, configured to read a keyword library corresponding to the protocol number;

a state storage unit 424, configured to store the packet when the packet is in a cross-package state;

a library updating unit 425, configured to update the keyword library and establish a keyword library that corresponds to the protocol type corresponding to the protocol number when the keyword library corresponding to the protocol number does not exist; and a library storage unit 426, configured to store a keyword library corresponding to each protocol, where each protocol corresponds to one keyword library.

Specifically, the signature recognizing module 42 is further configured to recognize a character, a regular expression, a port number, and an IP address of the packet.

Figure 6:
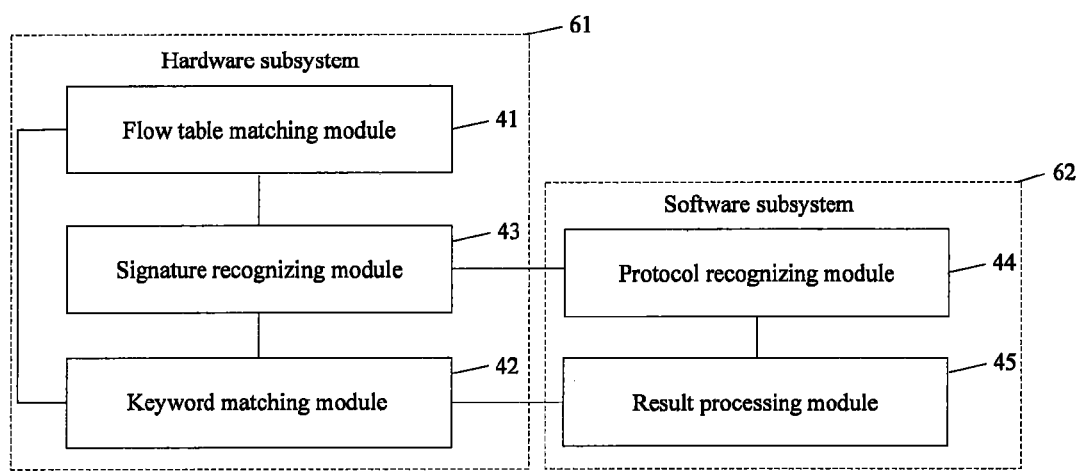
FIG. 6 shows a structure of an apparatus according to another embodiment of the present invention.

As shown in FIG. 6, the apparatus for protocol parsing may include two subsystems: a hardware subsystem 61 and a software subsystem 62. Specifically, the hardware subsystem 61 may include:

a flow table matching module 41, a signature recognizing module 43, and a keyword matching module 42;

further, the flow table matching module 41 may use an FPGA (Field Programmable Gate Array, field programmable gate array) or a network processor;

the signature recognizing module 43 and the keyword matching module 42 may be implemented on a same FPGA or ASIC (Application Specific Integrated Circuit, application specific integrated circuit), or different FPGAs or ASICs.

Specifically, the software subsystem 62 may include:

a result processing module 45 and a protocol recognizing module 44;

Specifically, the software subsystem implements protocol recognition, result processing, and DPI application functions through a multi-core MIPS/ARM/X86 CPU.

The apparatus for protocol parsing provided in the embodiment recognizes a received packet according to the quintuple of the packet by using the flow table matching module 41, sends the packet of which the protocol type is recognized to the keyword matching module 42 for keyword matching, sends the result of the keyword matching to the result processing module 45 for parsing, sends the packet of which the protocol type is not recognized to the signature recognizing module 43 for signature recognition, and sends the text-based protocol in the the packet of which the protocol type is recognized to the keyword matching module 42 for keyword matching, and the result processing module 45 parses the matching result of the protocol that undergoes keyword matching. Compared with the prior art, the apparatus for protocol parsing provided in this embodiment implements, in the keyword matching module 42, keyword matching on a packet through a keyword matching rule in the keyword library corresponding to a protocol type of the packet, where, the keyword matching rule in the keyword library includes a keyword and the content of the keyword to be parsed expressed using a regular expression. In this manner, when a new protocol or new field needs to be parsed, only a new keyword library needs to be added, and a new matching rule is written by using regular expressions. The implementation of writing a matching rule by using regular expressions is simple. Therefore, the extensibility of protocols and protocol fields is enhanced.

The apparatus for protocol parsing provided in this embodiment can implement the preceding method embodiments. For the function implementation, refer to the description in the method embodiments. The method and apparatus for protocol parsing provided in the embodiments can apply to protocol parsing for a packet, but are not confined to such application.

Those skilled in the art can complete all or part of the steps in the preceding method by using a program to instruct the hardware. The program can be stored in a storage medium that can be read by a computer. The procedure for executing the program can include the flows of the methods provided in an embodiment of the present invention. The storage medium can be magnetic disk, compact disk, read-only memory (Read-Only Memory, ROM), or random access memory (Random Access Memory, RAM).

In conclusion, the above are merely embodiments of the present invention. However, the scope of the present invention is not limited thereto. Changes or replacements readily apparent to persons skilled in the prior art within the technical scope of the present invention should fall within the protection scope of the present invention. Therefore, the protection scope of the present invention is subject to the appended claims.

What is claimed is:

1. A method of protocol parsing, comprising:
    determining whether a protocol type of a packet is recognized through flow table matching performed on the packet;
    performing keyword matching on the packet according to a keyword matching rule in a keyword library corresponding to the protocol type of the packet when the protocol type is recognized as a text-based protocol type according to the determining, and extracting content of a keyword to be parsed in the packet, the keyword matching rule in the keyword library including a keyword and the content of the keyword to be parsed expressed using a regular expression; and
    performing protocol recognition on the packet when the protocol type of the packet recognized is other than a text-based protocol type according to the determining, and sending a result of the protocol recognition to an application software program to process, and
    wherein when the protocol type of the packet is determined unrecognized through the flow table matching, performing signature recognition to determine whether the protocol type of the packet is recognized as a text-based protocol type; and performing the keyword matching on the packet when the protocol type of the packet is recognized as a text-based protocol type through the signature recognition;
    otherwise, performing protocol recognition on the packet to recognize the protocol type of the packet.

2. The method according to claim 1, wherein the performing of the keyword matching on the packet, and extracting the content of a keyword to be parsed in the packet comprises:
    reading a protocol number corresponding to the protocol type of the packet;
    reading a keyword library corresponding to the protocol number; and
    performing keyword matching on the packet according to the keyword library corresponding to the protocol number to obtain a matching rule ID corresponding to a matched keyword, and a start offset position and an end offset position of the matched keyword.

3. The method according to claim 2, further comprising:
    when the keyword library corresponding to the protocol number does not exist, updating the keyword library, and establishing a keyword library that corresponds to the protocol type corresponding to the protocol number.

4. The method according to claim 3, wherein the establishing of the keyword library that corresponds to the protocol type corresponding to the protocol number comprises: using a key field and a key field value of the protocol type as matching features to establish the keyword library.

5. The method according to claim 2, further comprising:
    storing the packet when the packet is in a cross-package state.

6. The method according to claim 2, wherein the keyword library is established based on each protocol, and each protocol corresponds to one independent keyword library.

7. The method according to claim 2, further comprising:
    encapsulating and reporting a keyword matching result after the keyword matching is complete.

8. The method according to claim 1, wherein, the determining of the protocol type and the performing of the keyword matching are implemented by a hardware subsystem, and the performing of the protocol recognition is implemented by a software subsystem, and
    the method further includes processing, by the software subsystem, a result of the keyword matching.

9. The method according to claim 8, wherein:
    the processing, by the software subsystem, of the result of the keyword matching comprises:
    encapsulating, by the software subsystem, a matching rule ID corresponding to a matched keyword and a start offset position and an end offset position of the matched keyword into a data structure, so that the application software program performs data processing according to the data structure.

10. An apparatus of protocol parsing, comprising:
    a flow table matching module, configured to recognize a protocol type of a packet through flow table matching performed on the packet;
    a keyword matching module, configured to perform keyword matching on the packet according to a keyword matching rule in a keyword library corresponding to the protocol type of the packet when the protocol type is recognized as a text-based protocol type according to a determination by the flow table matching module, and extract content of a keyword to be parsed in the packet, the keyword matching rule in the keyword library including a keyword and the content of the keyword expressed using a regular expression;
    a protocol recognizing module, configured to perform protocol recognition on the packet when the protocol type of the packet recognized is other than a text-based protocol type according to the determination, and send a result of the protocol recognition after the protocol recognition to an application software program to process; and
    a signature recognizing module, configured to perform signature recognition to determine whether the protocol type of the packet is recognized as a text-based protocol type; and perform keyword matching on the packet when the protocol type of the packet is recognized as a text-based protocol type through the signature recognition; and
    otherwise, perform protocol recognition on the packet to recognize the protocol type of the packet.

11. The apparatus according to claim 10, wherein the keyword matching module comprises:
    a matching engine unit, configured to read a protocol number corresponding to the protocol type of the packet; and
    a library managing unit, configured to read a keyword library corresponding to the protocol number;
    wherein, the matching engine unit is further configured to perform, according to the keyword library, keyword matching on the packet to obtain a matching rule ID corresponding to a matched keyword, and a start offset position and an end offset position of the matched keyword.

12. The apparatus according to claim 11, wherein the keyword matching module further comprises:
   a library updating unit, configured to update the keyword library and establish a keyword library that corresponds to the protocol type corresponding to the protocol number when the keyword library corresponding to the protocol number does not exist.

13. The apparatus according to claim 11, wherein the keyword matching module further comprises:
   a state storage unit, configured to store the packet when the packet is in a cross-package state.

14. The apparatus according to claim 11, wherein the keyword matching module further comprises:
   a library storage unit, configured to store a keyword library corresponding to each protocol, wherein each protocol corresponds to one keyword library.

15. The apparatus according to claim 11, wherein the keyword matching module further comprises:
   a result reporting unit, configured to encapsulate and report a keyword matching result after the keyword matching is complete.

16. The apparatus according to claim 10, wherein, the apparatus includes a hardware subsystem and a software subsystem,
   the hardware subsystem includes the flow table matching module and the keyword matching module,
   the software subsystem includes a protocol recognizing module and a result processing module, configured to process a result of the keyword matching.

17. The apparatus according to claim 10, comprising:
   a result processing module, configured to encapsulate a matching rule ID corresponding to a matched keyword, and a start offset position and an end offset position of the matched keyword into a data structure, so that the application software program performs data processing according to the data structure.

* * * * *